Sept. 5, 1950   H. F. KEMPTON   2,521,065
ANCHOR BOLT
Filed April 23, 1946

INVENTOR.
HENRY F. KEMPTON
BY
ATTORNEY

Patented Sept. 5, 1950

2,521,065

UNITED STATES PATENT OFFICE 2,521,065

ANCHOR BOLT

Henry F. Kempton, Denver, Colo.

Application April 23, 1946, Serial No. 664,231

1 Claim. (Cl. 85—2.8)

This invention relates to devices manipulable into gripping engagement interiorly of and with masonry walls and like structural or equivalent members to function as an anchor for securing various units and assemblies to and in mounted relation therewith, and has as an object to provide an improved construction and assembly of elements constituting such a device.

A further object of the invention is to provide an improved construction and assembly of elements constituting an expansion-type unit insertable within and manipulable into firmly-anchored relation interiorly of a hole intersecting a masonry wall or like structural member.

A further object of the invention is to provide an improved expansion-type anchor bolt susceptible of practical use with enhanced security of installed grip.

A further object of the invention is to provide an improved expansion-type anchor bolt retentive in use of its initially-developed gripping power.

A further object of the invention is to provide an improved expansion-type anchor bolt susceptible at will of convenient retraction and removal from mounted disposition.

A further object of the invention is to provide an improved expansion-type anchor bolt productive in use of a firmly-anchored, permanently-associated, attaching stud.

A further object of the invention is to provide an improved expansion-type anchor bolt wherein the expansible member and actuating element are interconnected in an operatively-inseparable unit, which is susceptible of simple and convenient development in a wide range of sizes and specific arrangements adapted to particular needs, which is efficient in the attainment of the ends for which designed, and which is operatively reliable in substantially indefinite permanence.

Figure 1:
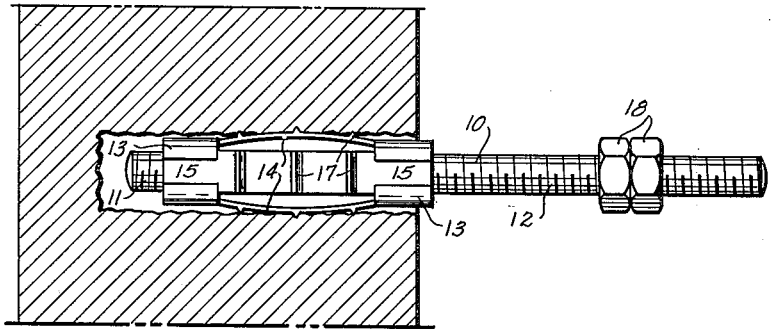
Figure 2:
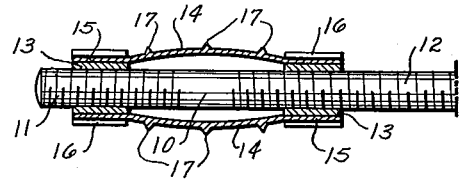
Figure 3:
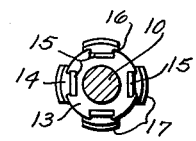
Figure 4:
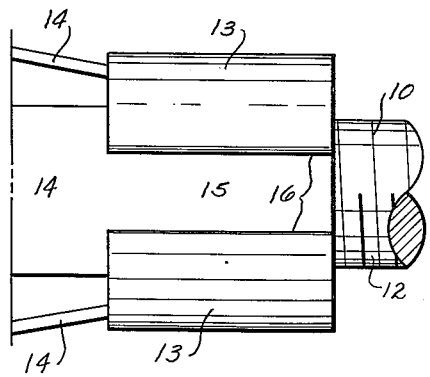
Figure 5:
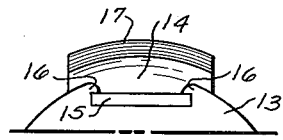

With the foregoing and other objects in view, my invention consists in the construction, arrangement, and combination of elements hereinafter set forth, pointed out in my claim, and illustrated by the accompanying drawing, in which:

Figure 1 is a side elevation of a typical embodiment of the improvement as positioned for practical use in gripping relation within a sectionalized wall fragment. Figure 2 is a section taken longitudinally of the device according to Figure 1 with the extension of the actuating element thereof foreshortened. Figure 3 is an end view of the showing of Figure 2. Figure 4 is a fragmentary, detail elevation, on an enlarged scale, of one end of the expansible member comprised in the assembly. Figure 5 is a fragmentary, detail end view of the construction typified by Figure 4.

In the construction of the improvement as shown, the actuating element of the assembly is illustrated as a straight, cylindrical rod or stem 10 whereof one end portion is surface-worked for a relatively short distance to the form of external screw threads 11 pitched in one direction and the other end thereof as well as the major length portion is similarly worked to the form of external screw threads 12 pitched in a direction opposite to that of the threads 11. For operative convenience, the threads 11 may be given a "left-hand" pitch and the threads 12 a "right-hand" pitch, although such thread arrangement is in no sense limitative or essential, and said threads 11 and 12 are preferably, though not necessarily, of corresponding, relatively low or fine lead.

The expansible member of the assembly consists of a pair of nuts 13, identical save for the pitch of their internal threads, respectively engaged with and for travel along the threads 11 and 12 of the stem 10, and a plurality, in this instance four, of like, longitudinally-bowed, metal straps 14 end-connected with and bridging between said nuts. The nuts 13 employed in the construction of the expansible member may have any desired number of angularly-related, marginal faces, so long as the paired nuts of a given unit are alike in such respect, and the corners of the nuts at the intersections of their angularly-related faces are preferably rounded, as shown, to facilitate installation of the assembly.

Due to the opposite pitch of the stem threads 11 and 12 and the operative engagement of the nuts 13 therewith, it is not feasible to complete fabrication of the expansible member in advance of and apart from its association with the stem 10, hence an important feature of the invention resides in the structural provisions made for perfecting the member assembly with the nuts 13 in place on said stem. For this purpose, each marginal face of a nut 13 designed to engage with an end of a strap 14 is routed or worked, prior to mounting of the nut on the stem 10, to provide therein a relatively-wide, shallow groove intersecting and opening outwardly from such face and intersecting the nut opposite ends for disposition parallel to the stem axis. Each such groove has a width less than that of the strap 14 to be therewith associated and a depth slightly greater than the strap thickness, and the ends of the straps 14 are formed as tongues 15 centrally and longitudinally aligned with the strap body and of a width to fit snugly within one of the nut face grooves, the said tongues 15 on the opposite ends of a given strap 14 being coplanar, so that, the nuts 13 having been threadedly engaged with their respective threads 11 and 12 of a stem 10 and turned thereon to a spacing between their adjacent ends corresponding to the length of a strap 14 bowed portion and to alignment of the grooves in their corresponding marginal faces, the end tongues 15 of a strap 14 may be engaged and pressed to seats within said aligned nut face grooves to thereby mount the bowed strap portion in bridging, outwardly-arched relation between said nuts with its shoulder offsets at the tongue inner ends bearing against the corresponding nut 13 inner face, whereafter upper corner margins of the nut grooves may be peened or rolled inwardly and downwardly against the tongue upper face margins, as at 16, to hold the tongue from separation radially of its nut and outwardly of its groove. One of the straps 14 having been secured to and between the nuts 13 as above described, the remaining straps of the assembly are similarly mounted to complete the unit ready for use. If and when desired, the frictional bearing of the strap 14 bowed portion outer surfaces against the interior walls of a hole wherein the device is installed may be enhanced by the provision of chisel-edged transverse ridges 17, points, barbs, or equivalent surface roughening or deforming features formed thereon or secured thereto. Further, the straps 14 bowed portions may be transversely, as well as longitudinally, arched to enhance the strap surface area contactable with the hole interior walls and to adapt the device for insertion in a hole of limited clearance diameter.

In the practical use of the device constructed and assembled as illustrated and hereinabove described, a pair of nuts 18 is threaded and clamped together on the longer stem portion threads 12, and the other end of the device, carrying the expansible member, inserted in the hole prepared for that purpose until the nut 13 adjacent the nuts 18 is partially, but not entirely, telescoped within the hole outer end and the device is positioned as shown in Figure 1, whereafter a wrench-type tool, of either socket or end-opening form, is engaged with the outward projection of the outer nut 13, a second wrench is gripped to the nuts 18, and the stem 18 is rotated by said second wrench within the nuts 13 and in a direction to draw said latter nuts toward each other along the stem, thereby outwardly bowing the straps 14 into tightly gripping engagement with the hole interior walls and at the same time withdrawing the outer nut 13 deeper within the hole end. As soon as the straps 14 first grip to the hole walls, the wrench holding the nut 13 against turning may be discarded to permit full retraction of said nut within the hole during the further actuation of the stem 10, since the grip of the expansible member interiorly of the hole will adequately hold the latter against rotation with said stem. Pressure developed between the nuts 13 as they are caused to approach each other is effectively transmitted to radially expand the strap bowed portions through the shoulders at the strap ends on each side of the tongues 15 against which the adjacent sides of said nuts bear; no dependence being placed on the tongue 15 engagements with the nuts 13 for the application of any operative forces.

With the expansible member firmly clamped in its mounted relation within the hole, so much of the stem extension beyond the wall as is not desired may be cut or clipped away to leave a threaded stud of selected length to which attachments may be secured by means of plain or crowned nuts in an obvious and well known manner; the anchorage thus provided being equal in holding strength to the shear factor of the material gripped by the device. Should it become expedient to remove the anchor from the wall, a wrench effectively applied to the projecting end of the stem 10 may be actuated to rotate said stem in a direction operable to separate the nuts 13, thereby either radially contracting the straps 14 until the assembly can be withdrawn from the hole or clearing the tongues 15 from one or the other of the nuts 13 to such disassembly of the member as nullifies its anchoring grip.

Since many changes, variations, and modifications in the specific form, construction, and arrangement of the elements shown and described may be had without departing from the spirit of my invention, I wish to be understood as being limited solely by the scope of the appended claim, rather than by any details of the illustrative showing and foregoing description.

I claim as my invention:

In an anchor bolt having a straight stem furnished with oppositely-threaded portions and a nut cooperatively engaged with each of said threaded portions, shallow grooves intersecting corresponding marginal faces of said nuts for spaced alignment longitudinally of said stem, a plurality of like, longitudinally bowed straps disposed to bridge between said nuts, integral tongues longitudinally projecting from shouldered relation with the strap ends and engaging within said nut grooves, and means for retaining said tongues seated within their respective grooves to dispose said straps in bearing engagement of their end shoulders against the nut inner faces and in outwardly-arched relation with and circumferentially about the stem portion intercepted between the nuts; said means comprising outer nut groove corners filleted over and against adjacent tongue outer surface margins.

HENRY F. KEMPTON.

REFERENCES CITED

The following references are of record in the file of this patent:

UNITED STATES PATENTS

| Number | Name | Date |
|---|---|---|
| 102,374 | Coyle | Apr. 26, 1870 |
| 836,231 | Wilkison | Nov. 20, 1906 |
| 1,804,843 | Santiago | May 12, 1931 |
| 1,966,052 | Sievers | July 10, 1934 |
| 2,018,251 | Croessant | Oct. 22, 1935 |
| 2,236,079 | Wipper | Mar. 25, 1941 |

FOREIGN PATENTS

| Number | Country | Date |
|---|---|---|
| 35,559 | Germany | May 17, 1886 |